(12) United States Patent
Poirier

(10) Patent No.: US 10,530,021 B2
(45) Date of Patent: Jan. 7, 2020

(54) SAMPLE COUPLED CHEMIRESISTOR FOR THERMAL EVENT DETECTION

(71) Applicant: FORD GLOBAL TECHNOLOGIES, LLC, Dearborn, MI (US)

(72) Inventor: Eric Poirier, Brownstown, MI (US)

(73) Assignee: FORD GLOBAL TECHNOLOGIES, LLC., Dearborn, MI (US)

( * ) Notice: Subject to any disclaimer, the term of this patent is extended or adjusted under 35 U.S.C. 154(b) by 164 days.

(21) Appl. No.: 15/837,696

(22) Filed: Dec. 11, 2017

(65) Prior Publication Data
US 2019/0181512 A1    Jun. 13, 2019

(51) Int. Cl.
| | |
|---|---|
| H01M 10/44 | (2006.01) |
| H01M 10/46 | (2006.01) |
| H01M 10/48 | (2006.01) |
| H01M 10/615 | (2014.01) |
| H01M 2/12 | (2006.01) |
| H02J 7/00 | (2006.01) |
| H01M 10/42 | (2006.01) |

(52) U.S. Cl.
CPC ........... *H01M 10/486* (2013.01); *H01M 2/12* (2013.01); *H01M 10/443* (2013.01); *H01M 10/615* (2015.04); *H02J 7/0014* (2013.01); *H01M 2010/4271* (2013.01)

(58) Field of Classification Search
CPC ......... H02J 7/009; H02J 7/0091; H02J 7/0008
USPC ...... 320/107, 114, 150, 153; 340/365, 636.1, 340/636.18, 636.19
See application file for complete search history.

(56) References Cited

U.S. PATENT DOCUMENTS

| | | | |
|---|---|---|---|
| 6,170,318 B1 * | 1/2001 | Lewis | G01N 27/126 340/632 |
| 8,105,538 B2 | 1/2012 | Ramamurthy et al. | |
| 9,632,050 B2 | 4/2017 | Zhong et al. | |
| 2010/0102975 A1 | 4/2010 | Vossmeyer et al. | |

* cited by examiner

*Primary Examiner* — Edward Tso
(74) *Attorney, Agent, or Firm* — David Kelley; Brooks Kushman P.C.

(57) ABSTRACT

A battery thermal event detection system includes a battery, a chemiresistor, and a temperature-sensitive sample in contact with a surface of the battery. The sample is configured to, responsive to a change in battery temperature, release a gas configured to alter a resistance of the chemiresistor. The system further includes a controller coupled with the chemiresistor and configured to, responsive to detecting a change in the resistance greater than a threshold change, reduce power supplied by the battery.

20 Claims, 2 Drawing Sheets

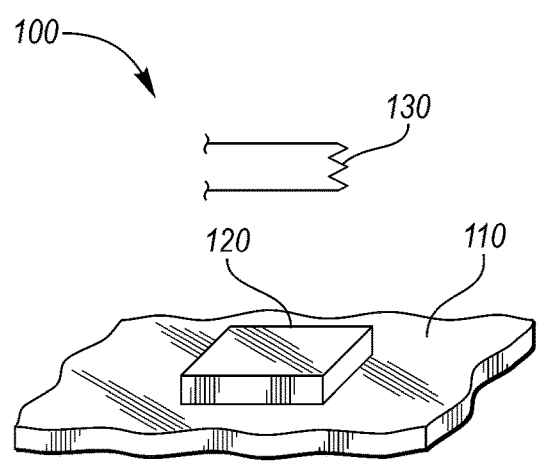
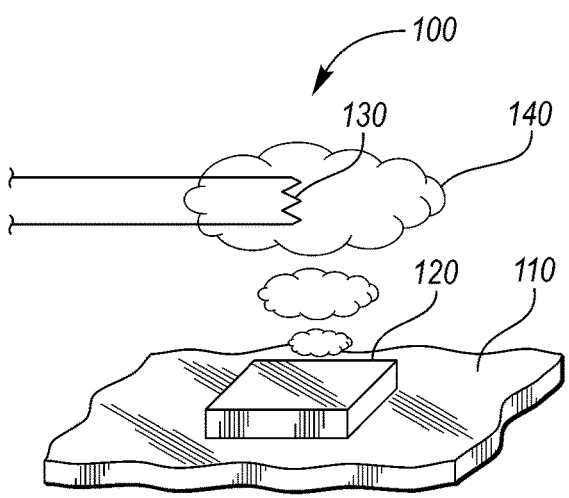
FIG. 1A  FIG. 1B
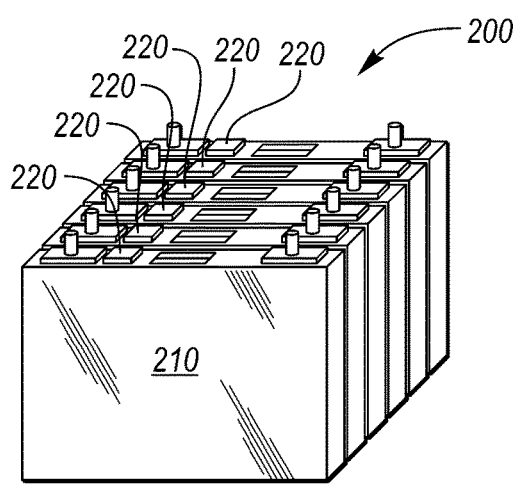
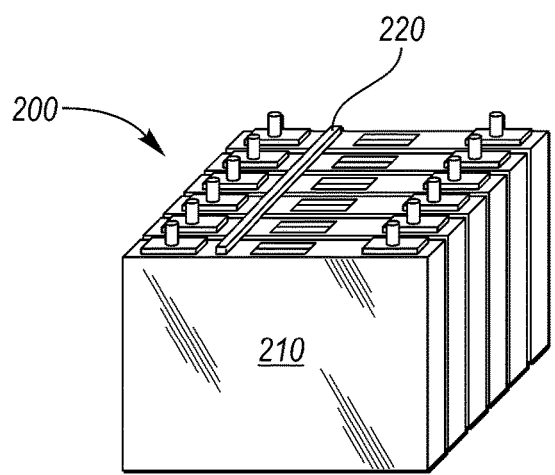
FIG. 2A  FIG. 2B

SAMPLE COUPLED CHEMIRESISTOR FOR THERMAL EVENT DETECTION

TECHNICAL FIELD

The present disclosure relates to temperature management for a high voltage traction battery.

BACKGROUND

Battery cell overheating can lead to venting of unwanted gases, such as hydrogen, methane, and carbon monoxide. Temperature measurement inside a high voltage traction battery pack is therefore critical to detect when a cell exceeds its maximum operating temperature. In a conventional battery pack, however, a single thermal event may not be detected, as a limited number of thermistors typically measure average temperature across a number of cells. In addition, monitoring temperature over all cells in the battery pack adds cost and complexity to the system.

SUMMARY

According to an embodiment, a battery thermal event detection system is disclosed. The battery thermal event detection system includes a battery, a chemiresistor, and a temperature-sensitive sample in contact with a surface of the battery. The sample is configured to, responsive to a change in battery temperature, release a gas configured to alter a resistance of the chemiresistor. The system further includes a controller coupled with the chemiresistor and configured to, responsive to detecting a change in the resistance greater than a threshold change, reduce power supplied by the battery.

According to one or more embodiments, the change in battery temperature may correspond to a change beyond a predetermined threshold temperature of the sample for releasing the gas. The sample may be a single-phase chemical species. In other embodiments, the sample may be a compound sample including a chemical species on a supporting medium. Further, the supporting medium may include at least one layer of porous material. The at least one layer of porous material may be activated carbon, molecular sieve, zeolite, porous PTFE, a metal-organic framework, or an encapsulating material. In one or more embodiments, the controller may be further configured to, responsive to detecting a change in resistance of the chemiresistor, terminate power supplied by the battery. The controller may detect the change in resistance of the chemiresistor when the change is greater than a predetermined threshold change in resistance. In one or more embodiments, the chemiresistor may be a metal oxide semiconductor, conductive polymer, or a nanomaterial. In some embodiments, the nanomaterial may be graphene, carbon, nanotubes, or nanoparticles.

According to an embodiment, a method of controlling a battery thermal event detection system is disclosed. The method includes, responsive to a temperature change in a battery, releasing a gas from a temperature-sensitive sample contacting a surface of the battery to alter a resistance of a chemiresistor; and by a controller, responsive to detecting the resistance changing beyond a predetermined change in resistance, reducing power supplied by the battery to reduce or stop heat generation.

According to one or more embodiments, the reducing may include terminating power supplied by the battery. The releasing may include evolving a chemical species from a bound state to a vapor or gaseous state. In some embodiments, the chemical species in the bound state may be stored in a supporting medium having at least one layer.

According to an embodiment, a system for monitoring temperature of a battery pack is disclosed. The system includes at least one battery cell, a chemiresistor within the pack having a resistance, and at least one temperature-sensitive sample. Each of the samples corresponds to and is in contact with each of the battery cells, and the samples are configured to, responsive to a cell temperature change, release a gas to change the resistance. The system further includes a controller coupled with the chemiresistor and configured to, responsive to detecting the resistance change greater than a threshold change, reduce power supplied by the pack.

According to one or more embodiments, the change in cell temperature may correspond to the battery cell reaching a threshold temperature of the sample for releasing the gas. The sample may be a single-phase chemical species. In other embodiments, the sample may be a compound sample including a chemical species on a supporting medium. The supporting medium may include at least one layer of porous material. The at least one layer may be activated carbon, molecular sieve, zeolite, porous PTFE, a metal-organic framework, or an encapsulating material.

BRIEF DESCRIPTION OF THE DRAWINGS

FIG. 1A shows a partial schematic diagram of a battery thermal event detection system, according to an embodiment.

FIG. 1B shows a partial schematic diagram of a battery thermal event detection system, according to an embodiment.

FIG. 2A shows a schematic diagram of a battery pack, according to an embodiment.

FIG. 2B shows a schematic diagram of a battery pack, according to another embodiment.

DETAILED DESCRIPTION

Figure 3A:
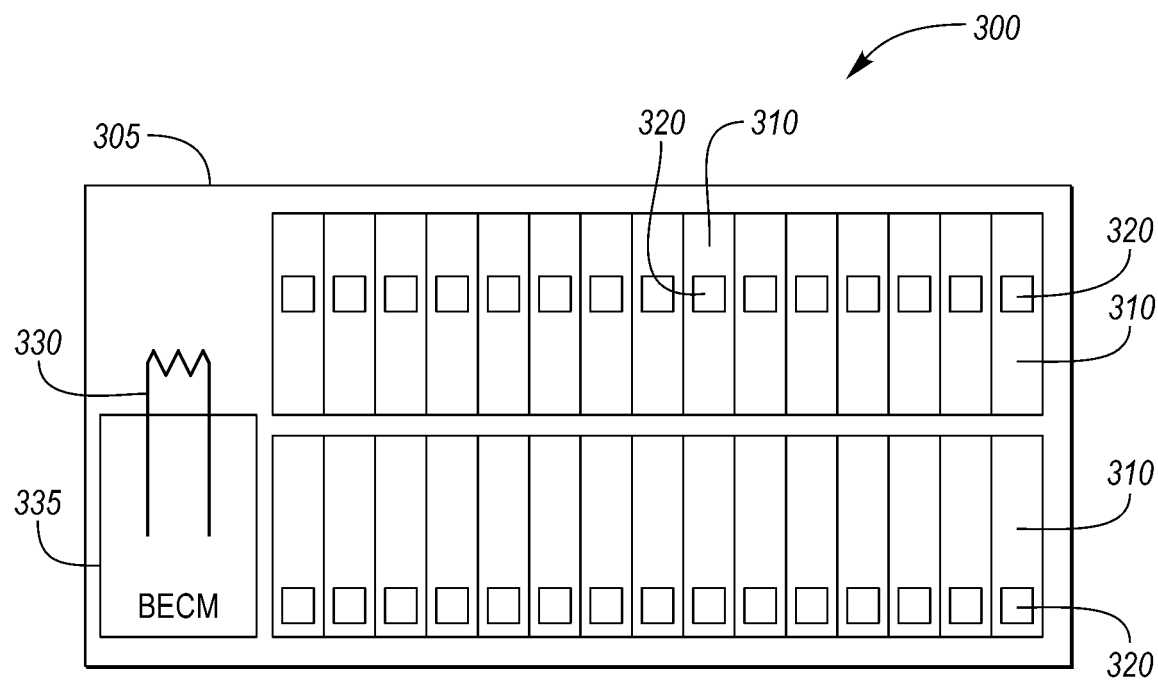
FIG. 3A shows a schematic diagram of a battery thermal event detection system, according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to an embodiment, a battery thermal event detection system is disclosed. The system couples a chemiresistor with a temperature-sensitive sample containing a chemical species and in contact with one or more battery cells. The chemical species will evolve as a gas (or vapor) from a bound state to a gaseous state when heat transferred from the overheating cell(s) increases the sample temperature beyond a threshold temperature for degassing. The chemical species causes the ohmic resistance of the chemiresistor to change in its presence. The present system thereof replaces multiple connections and sensors by a chemical species transferring information of a thermal event from the cell(s) to the controller through the atmosphere inside the pack, reducing cost and complexity. The system thereof, will allow the controller to take appropriate action to reduce heat generation from electrical current flow in the event of the battery exceeding a given temperature threshold and will prevent operation under overtemperature conditions. By using a single hardwire sensor coupled to the volatile chemical species, production cost, safety, and performance can be enhanced.

Referring to FIGS. 1A-B, a partial schematic diagram of a battery thermal event detection (or, interchangeably, thermal management) system 100 is shown according to an embodiment. A battery surface 110 is in contact with a temperature-sensitive sample 120. The battery surface 110 may be any surface of a battery cell. Battery surface 110 of a cell and temperature-sensitive sample 120 may be sealed within a battery pack containing one or more cells. Each cell may have a temperature-sensitive sample 120 contacting a surface 110. The temperature-sensitive sample 120 includes a chemical species. The chemical species is in a bound phase (e.g., condensed or absorbed) during normal operation, i.e. at normal operating temperatures. The chemical species is thermally released from the sample 120 in a gaseous or vapor state upon the battery exceeding its maximum operating temperature ($T_{max}$, e.g., 80° C.), as reflected by the change in temperature of the surface 110. The chemical species in sample 120 may be either a single-phase chemical species or a compound sample containing the chemical species on a supporting medium. The supporting medium may be, but is not limited to, a layered material having at least one layer of porous material, such as activated carbon, molecular sieve, zeolite, porous PTFE, a metal-organic framework, or an encapsulating material (e.g., microspheres). Various forms of such materials are available commercially, including films, powders, papers, paste or tapes that can be easily attached to the cells. A compound sample containing the chemical species may be produced by saturating the supporting medium with the chemical species by a controlled exposure to its liquid, vapor of gas phase. In certain embodiments, the chemical species may be, but is not limited to, carbon dioxide, methane, toluene, hydrogen, an alkane, or an organic solvent. The release temperature of the sample 120 is the temperature at which the chemical species evolves from a bound state to a gaseous or vapor state, where it releases inside the battery pack. The temperature specific release could be based off a selected phase transition (i.e. liquid-gas, solid-gas); desorption from the porous sorbent (e.g. activated carbon, molecular sieve); or degassing from microspheres. The materials used are selected so that the release temperature corresponds to $T_{max}$ of the battery.

Battery thermal event detection system 100 also includes a chemiresistor 130. The system 100, including the sample 120 and chemiresistor 130, may be in a sealed battery pack where the chemical species can quickly reach detectable concentration levels while staying at safe levels for both people and equipment. The chemiresistor 130 may be based on various technologies, such as, but not limited to, metal oxide semiconductors, conductive polymers, and nanomaterials like graphene, carbon nanotubes, and nanoparticles. Chemiresistor 130 is installed inside the battery pack, and the resistance of the chemiresistor is monitored by a controller. The controller may be a standalone controller, a Battery Energy Control Module (BECM), or a controller in communication with the BECM. As in FIG. 1B, the released chemical gas or vapor during a thermal event (where battery temperature exceeds $T_{max}$) diffuses from the sample 120 to the chemiresistor 130, and changes its resistance. Above Tmax, relatively small amounts (e.g. <1000 ppm) of the chemical species diffuse inside the pack and cause the chemiresistor to change its Ohmic resistance. Below Tmax, no gas or vapor is present inside the pack, and chemiresistor 130 maintains a nominal resistance. The change in resistance of the chemiresistor 130 is measured by the BECM, which takes appropriate action to prevent further cell heating. A Wheatstone bridge may be used if smaller changes in resistance are measured. The BECM may open the battery contactors or cut power to the contactors when it measures a sizeable change in the chemiresistor 130 resistance. The BECM may also limit the amount of current the battery is outputting in order to reduce power dissipating as heat in the cells (e.g. Joule heating). Alternatively, the chemiresistor 130 may be placed within an interlock circuit, and the BECM opens contactors under similar conditions. Since the power supplied by the battery generates heat as the current flows through the cells (Joule heating, $P=RI^2$), reducing or terminating power supplied by the battery can prevent dangerous overheating of the cells.

FIG. 2A shows a schematic illustration of a battery cell module 200 according to an embodiment. A battery pack may include one or more battery cell modules 200. Battery cell module 200 includes individual battery cells 210 having cell surfaces. In this embodiment, each cell 210 has a temperature-sensitive sample 220 contacting a surface. In another embodiment, as shown in FIG. 2B, the module 200 includes individual battery cells 210 having surfaces. In this embodiment, a single temperature-sensitive sample 220 spans the surfaces of the individual cells 210. Although the sample is on the top surface of the cells 210 in FIGS. 2A-B, the illustration is not intended to be limiting, and the temperature-sensitive samples 220 may be placed on any surface of the cells 210.

Figure 3B:
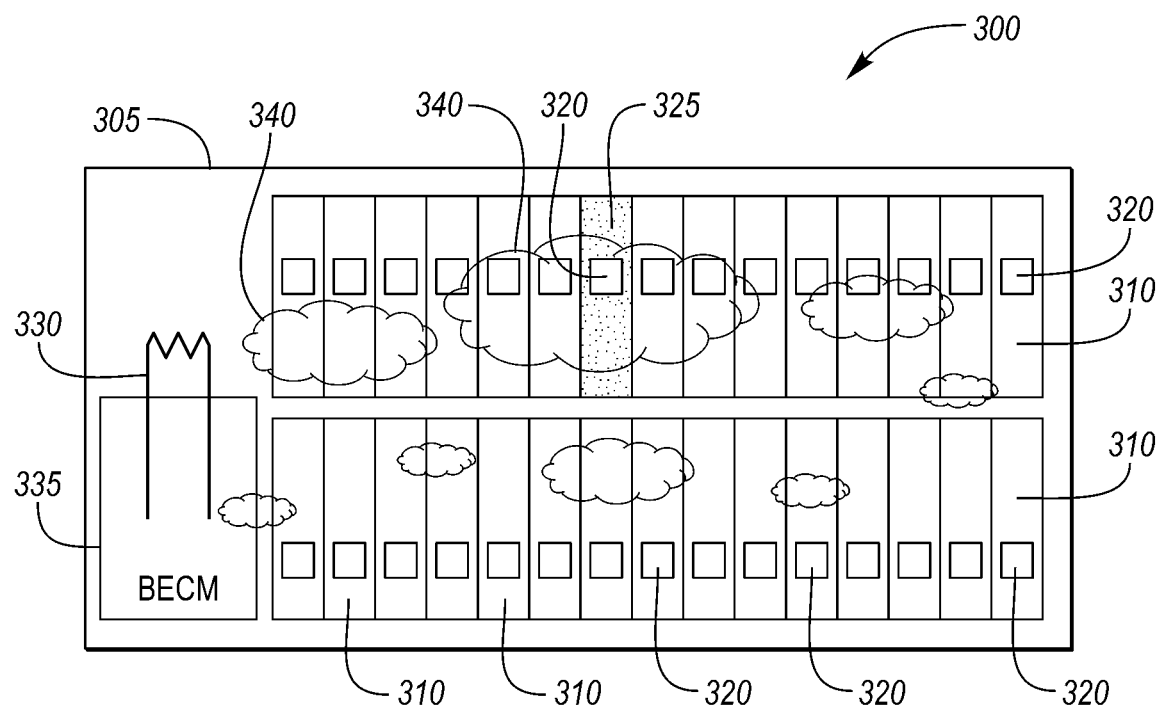
FIG. 3B shows a schematic diagram of a battery thermal event detection system, according to an embodiment.

FIGS. 3A and 3B show a schematic illustration of the battery thermal event detection system 300, incorporating the embodiment of FIG. 2A, where each cell 310 has its own temperature-sensitive sample 320 contacting a surface. The sealed battery pack 305 includes the cells 310 and the temperature-sensitive samples 320. Chemiresistor 330 is also within the battery pack 305, and connected to controller (or BECM) 335. Within the normal operating temperature range of the battery pack 305, the chemiresistor has a resistance R. When a single cell of the battery pack 305 overheats such that the temperature reaches $T_{max}$, as depicted by cell 325, the chemical species 340 is released inside the pack 305. The chemical species 340 changes the resistance of the chemiresistor 330, which is monitored by the BECM 335. Upon receiving or detecting the change in resistance (by comparing with a predetermined threshold change in resistance), the BECM can reduce or cut off power supplied by the battery pack 305. In the embodiment depicted by FIG. 2B, although not illustrated in a figure, a similar thermal event in a single cell would similarly release the chemical species. As such, the system 300 can account for when a single cell within the pack overheats. Although not illustrated, the battery thermal event detection system of the present embodiment is capable of detecting thermal events in multiple cells, as the sample will release from multiple cells upon overheating. The system will detect the gas via the change in resistance of the chemiresistor, and reduce or terminate power supplied by the battery.

The battery thermal event detection system of the present disclosure may improve driving range and available power for electric vehicles. The battery cell temperature is controlled in a safe and cost effective way, since it couples a chemiresistor and a temperature-sensitive sample, and involves, one (or optionally, more) sensors to monitor multiple cells in a battery pack. In addition, the thermal event detection system need not include extra wires, as the occurrence of the thermal event is indicated by the chemical species via the atmosphere inside the pack. The battery thermal event detection system provides versatility in thermal management as individual cells or other components can be monitored. The battery thermal event detection system may be used on any type of battery or battery pack, including but not limited to, high voltage traction batteries, stationary energy storage, fuel cells, consumer electronics and aerospace, as non-limiting examples.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A battery thermal event detection system comprising:
    a battery;
    a chemiresistor;
    a temperature-sensitive sample in contact with a surface of the battery and configured to, responsive to a change in battery temperature, release a gas configured to alter a resistance of the chemiresistor; and
    a controller coupled with the chemiresistor and configured to, responsive to detecting a change in the resistance greater than a threshold change, reduce power supplied by the battery.

2. The battery thermal event detection system of claim 1, wherein the change in battery temperature corresponds to a change beyond a predetermined threshold temperature of the sample for releasing the gas.

3. The battery thermal event detection system of claim 1, wherein the sample is a single-phase chemical species.

4. The battery thermal event detection system of claim 1, wherein the sample is a compound sample including a chemical species on a supporting medium.

5. The battery thermal event detection system of claim 4, wherein the supporting medium comprises at least one layer of porous material.

6. The battery thermal event detection system of claim 5, wherein the at least one layer of porous material is activated carbon, molecular sieve, zeolite, porous PTFE, a metal-organic framework, or an encapsulating material.

7. The battery thermal event detection system of claim 1, wherein the controller is further configured to, responsive to detecting a change in resistance of the chemiresistor, terminate power supplied by the battery.

8. The battery thermal event detection system of claim 1, wherein the controller detects the change in resistance of the chemiresistor when the change is greater than a predetermined threshold change in resistance.

9. The battery thermal event detection system of claim 1, wherein the chemiresistor is a metal oxide semiconductor, conductive polymer, or a nanomaterial.

10. The battery thermal event detection system of claim 9, wherein the nanomaterial is graphene, carbon, nanotubes, or nanoparticles.

11. A method of controlling a battery thermal event detection system comprising:
    responsive to a temperature change in a battery, releasing a gas from a temperature-sensitive sample contacting a surface of the battery to alter a resistance of a chemiresistor; and
    by a controller, responsive to detecting the resistance changing beyond a predetermined change in resistance, reducing power supplied by the battery to reduce or stop heat generation.

12. The method of claim 11, wherein the reducing includes terminating power supplied by the battery.

13. The method of claim 11, wherein the releasing includes evolving a chemical species from a bound state to a vapor or gaseous state.

14. The method of claim 13, wherein the chemical species in the bound state is stored in a supporting medium having at least one layer.

15. A system for monitoring temperature of a battery pack, comprising:
    at least one battery cell;
    a chemiresistor within the pack having a resistance;
    at least one temperature-sensitive sample, each of the samples corresponding to and in contact with each of the battery cells, configured to, responsive to a cell temperature change, release a gas to change the resistance; and
    a controller coupled with the chemiresistor and configured to, responsive to detecting the resistance change greater than a threshold change, reduce power supplied by the pack.

16. The system of claim 15, wherein the change in cell temperature corresponds to the battery cell reaching a threshold temperature of the sample for releasing the gas.

17. The system of claim 15, wherein the sample is a single-phase chemical species.

18. The system of claim 15, wherein the sample is a compound sample including a chemical species on a supporting medium.

19. The system of claim 18, wherein the supporting medium comprises at least one layer of porous material.

20. The system of claim 19, wherein the at least one layer is activated carbon, molecular sieve, zeolite, porous PTFE, a metal-organic framework, or an encapsulating material.

* * * * *